(12) United States Patent
Brewer et al.

(10) Patent No.: US 12,367,603 B2
(45) Date of Patent: Jul. 22, 2025

(54) LOCALIZATION BASED ON DETECTED SPATIAL FEATURES

(71) Applicant: Apple Inc., Cupertino, CA (US)

(72) Inventors: Anna L. Brewer, Cupertino, CA (US); Devin W. Chalmers, Oakland, CA (US); Thomas G. Salter, Foster City, CA (US)

(73) Assignee: Apple Inc., Cupertino, CA (US)

( * ) Notice: Subject to any disclaimer, the term of this patent is extended or adjusted under 35 U.S.C. 154(b) by 428 days.

(21) Appl. No.: 17/852,114

(22) Filed: Jun. 28, 2022

(65) Prior Publication Data

US 2023/0102686 A1    Mar. 30, 2023

Related U.S. Application Data

(60) Provisional application No. 63/247,991, filed on Sep. 24, 2021.

(51) Int. Cl.
*G06T 7/70*    (2017.01)
*G06T 7/12*    (2017.01)
*G06T 19/00*    (2011.01)

(52) U.S. Cl.
CPC .................. *G06T 7/70* (2017.01); *G06T 7/12* (2017.01); *G06T 19/006* (2013.01)

(58) Field of Classification Search
CPC .... G06T 7/70; G06T 7/12; G06T 7/75; G06T 19/006
See application file for complete search history.

(56) References Cited

U.S. PATENT DOCUMENTS

| 9,047,668 | B2 | 6/2015 | Haas et al. |
| 10,028,102 | B2 | 7/2018 | Modica et al. |
| 2016/0335275 | A1 | 11/2016 | Williams et al. |
| 2020/0334854 | A1 | 10/2020 | Lin et al. |
| 2021/0264674 | A1* | 8/2021 | Shahrokni ................ G06T 7/70 |

* cited by examiner

*Primary Examiner* — Said M Elnoubi
(74) *Attorney, Agent, or Firm* — Fernando & Partners, LLP; Allen J. Oh

(57) ABSTRACT

In one implementation, a method of localizing a device is performed at a device including one or more processors and non-transitory memory. The method includes obtaining an estimate of a pose of the device in an environment. The method includes obtaining an environmental model of the environment including a spatial feature in the environment defined by a first spatial feature location. The method includes determining a second spatial feature location of the spatial feature based on the estimate of the pose of the device. The method includes determining an updated estimate of the pose of the device based on the first spatial feature location and the second spatial feature location.

18 Claims, 6 Drawing Sheets

500

At a device including one or more processors and non-transitory memory: — 510

Obtaining an estimate of a pose of the device in an environment

↓

Obtaining an environmental model of the environment including a spatial feature in the environment defined by a first spatial feature location — 520

↓

Determining a second spatial feature location of the spatial feature based on the estimate of the pose of the device — 530

↓

Determining an updated estimate of the pose of the device based on the first spatial feature location and the second spatial feature location — 540

Figure 5

LOCALIZATION BASED ON DETECTED SPATIAL FEATURES

CROSS-REFERENCE TO RELATED APPLICATIONS

This application claims priority to U.S. Provisional Patent App. No. 63/247,991, filed on Sep. 24, 2021, which is hereby incorporated by reference in its entirety.

TECHNICAL FIELD

The present disclosure generally relates to systems, methods, and devices for localizing a device or content in an environment based on spatial features detected in the environment.

BACKGROUND

Determining the location (e.g., localization) of an electronic device enables a wide range of user experiences, such as automatically turning on a light when the electronic device enters a room, adjusting a speaker volume based on distance from the speaker to the electronic device, or displaying previously placed extended reality (XR) content in an environment in which the electronic device is present. However, inaccuracy in determining the location of the device can lead to inaccurate placement of XR content in the environment.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 5 is a flowchart representation of a method of localizing a device in accordance with some implementations.

Figure 1:
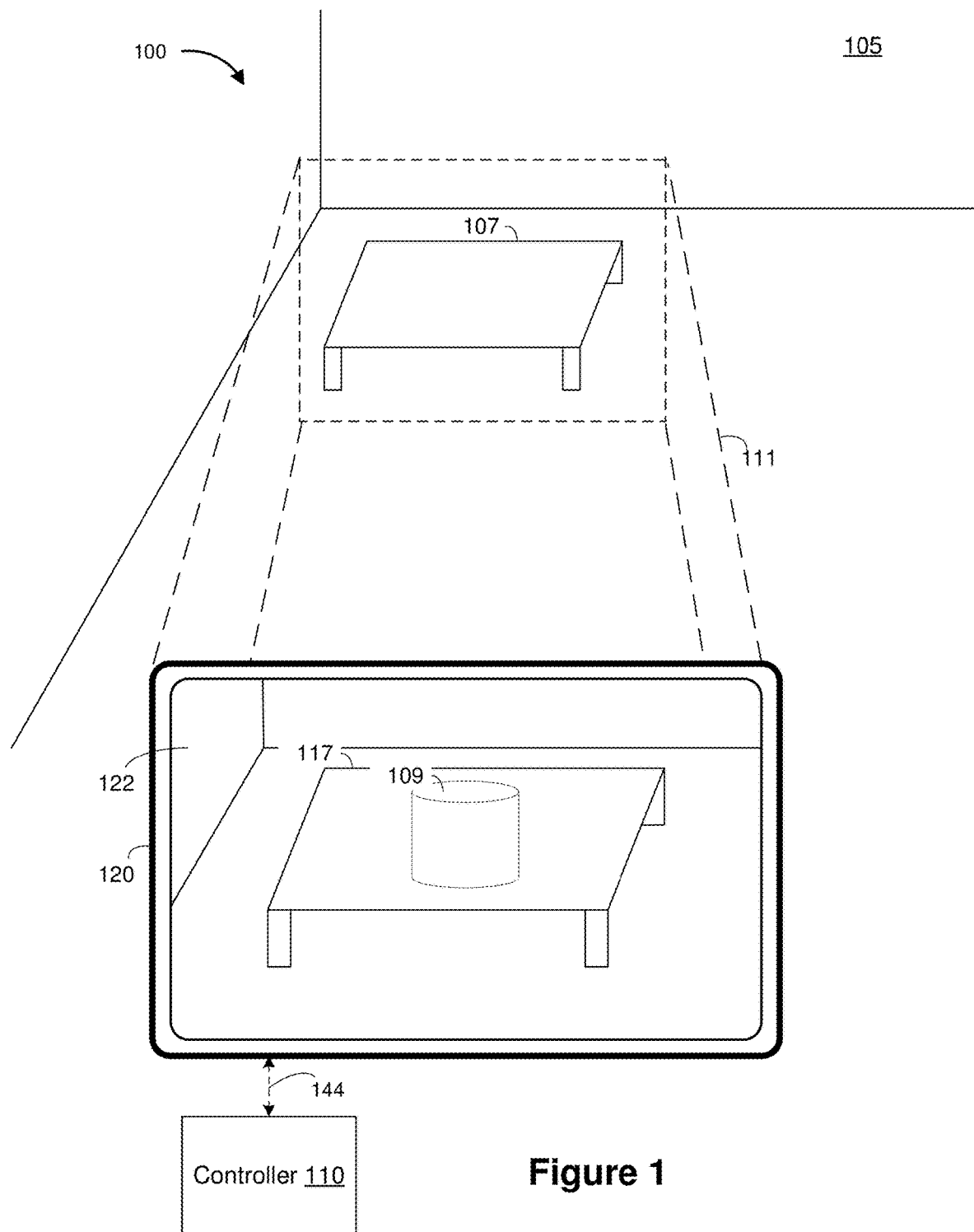
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for localizing a device. In various implementations, the method is performed by a device including one or more processors and non-transitory memory. The method includes obtaining an estimate of a pose of the device in an environment. The method includes obtaining an environmental model of the environment including a spatial feature in the environment defined by a first spatial feature location. The method includes determining a second spatial feature location of the spatial feature based on the estimate of the pose of the device. The method includes determining an updated estimate of the pose of the device based on the first spatial feature location and the second spatial feature location.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

A physical environment refers to a physical place that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As an example, the XR system may detect movement of the electronic device presenting the XR environment (e.g., a mobile phone, a tablet, a laptop, a head-mounted device, and/or the like) and, in response, adjust graphical content and an acoustic field presented by the electronic device to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light sources, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

As noted above, a head-mounted device equipped with a scene camera takes many images of a user's environment throughout days or weeks of usage. The device can identify objects (e.g., paintings, posters, album covers) in those images and store information regarding the objects in a database. In order to access the information in an efficient way, the information regarding the objects is stored in association with respective contextual information of the time at which each object is detected, such as a time, location, or current activity. Accordingly, in response to a query of "What was that album cover I was looking at when I was at Jim's house?", the electronic device can return information regarding a particular album cover detected at a particular time or while at a particular location.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120.

In some implementations, the controller 110 is configured to manage and coordinate an XR experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In another example, the controller 110 is included within the enclosure of the electronic device 120. In some implementations, the functionalities of the controller 110 are provided by and/or combined with the electronic device 120.

In some implementations, the electronic device 120 is configured to provide the XR experience to the user. In some implementations, the electronic device 120 includes a suitable combination of software, firmware, and/or hardware. According to some implementations, the electronic device 120 presents, via a display 122, XR content to the user while the user is physically present within the physical environment 105 that includes a table 107 within the field-of-view 111 of the electronic device 120. As such, in some implementations, the user holds the electronic device 120 in his/her hand(s). In some implementations, while providing XR content, the electronic device 120 is configured to display an XR object (e.g., an XR cylinder 109) and to enable video pass-through of the physical environment 105 (e.g., including a representation 117 of the table 107) on a display 122. The electronic device 120 is described in greater detail below with respect to FIG. 3.

According to some implementations, the electronic device 120 provides an XR experience to the user while the user is virtually and/or physically present within the physical environment 105.

In some implementations, the user wears the electronic device 120 on his/her head. For example, in some implementations, the electronic device includes a head-mounted system (HMS), head-mounted device (HMD), or head-mounted enclosure (HME). As such, the electronic device 120 includes one or more XR displays provided to display the XR content. For example, in various implementations, the electronic device 120 encloses the field-of-view of the user. In some implementations, the electronic device 120 is a handheld device (such as a smartphone or tablet) configured to present XR content, and rather than wearing the electronic device 120, the user holds the device with a display directed towards the field-of-view of the user and a camera directed towards the physical environment 105. In some implementations, the handheld device can be placed within an enclosure that can be worn on the head of the user. In some implementations, the electronic device 120 is replaced with an XR chamber, enclosure, or room configured to present XR content in which the user does not wear or hold the electronic device 120.

Figure 2:
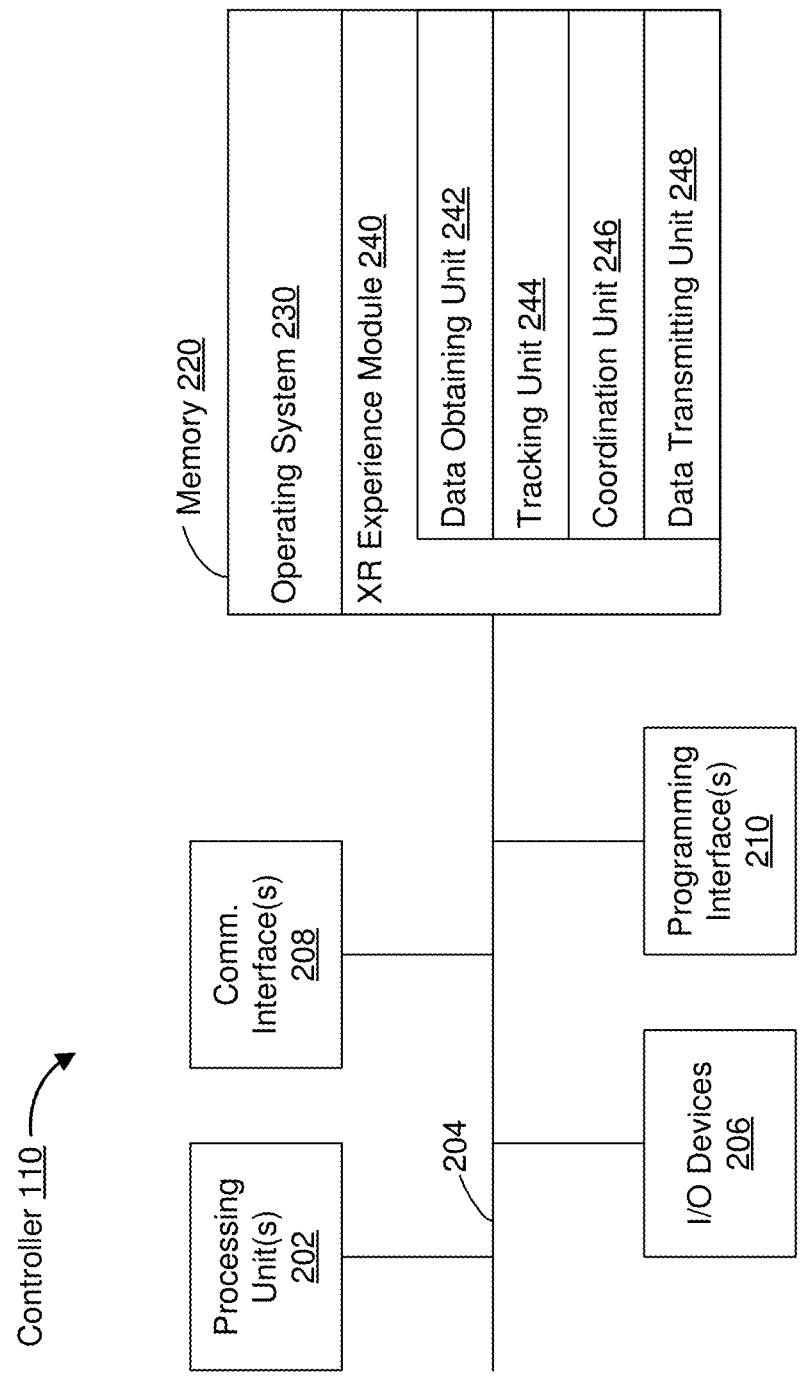
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an XR experience module 240.

The operating system 230 includes procedures for handling various basic system services and for performing hardware dependent tasks. In some implementations, the XR experience module 240 is configured to manage and coordinate one or more XR experiences for one or more users (e.g., a single XR experience for one or more users, or multiple XR experiences for respective groups of one or more users). To that end, in various implementations, the XR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the electronic device 120 of FIG. 1. To that end, in various implementations, the data obtaining unit 242 includes instructions and/or logic therefor, and heuristics and metadata therefor.

In some implementations, the tracking unit 244 is configured to map the physical environment 105 and to track the position/location of at least the electronic device 120 with respect to the physical environment 105 of FIG. 1. To that end, in various implementations, the tracking unit 244 includes instructions and/or logic therefor, and heuristics and metadata therefor.

In some implementations, the coordination unit 246 is configured to manage and coordinate the XR experience presented to the user by the electronic device 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the electronic device 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
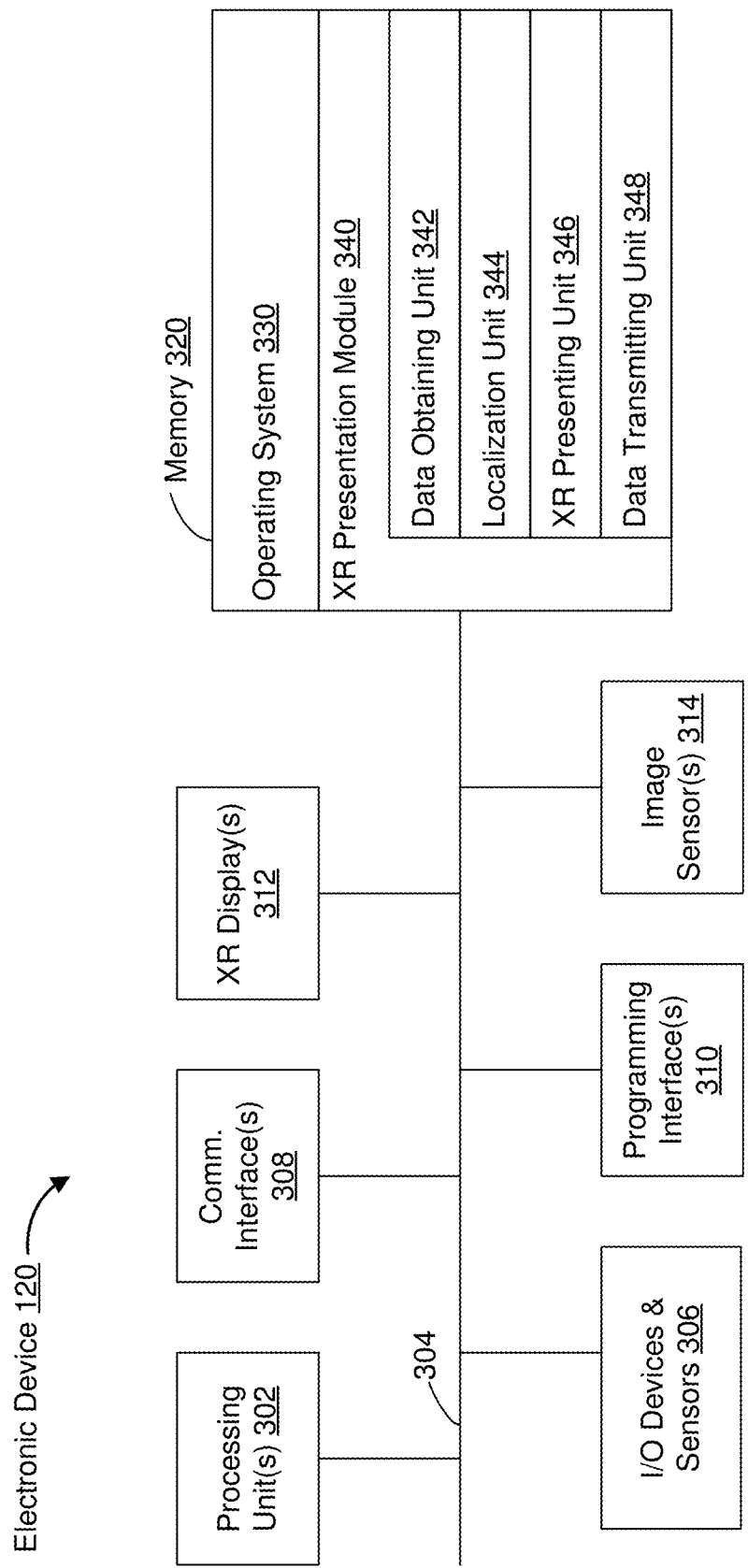
FIG. 3 is a block diagram of an example electronic device in accordance with some implementations.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 312 are configured to provide the XR experience to the user. In some implementations, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 312 correspond to diffractive, reflective, polarized, holographic, etc. waveguide displays. For example, the electronic device 120 includes a single XR display. In another example, the electronic device includes an XR display for each eye of the user. In some implementations, the one or more XR displays 312 are capable of presenting MR and VR content.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the scene as would be viewed by the user if the electronic device 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an XR presentation module 340.

The operating system 330 includes procedures for handling various basic system services and for performing hardware dependent tasks. In some implementations, the XR presentation module 340 is configured to present XR content to the user via the one or more XR displays 312. To that end, in various implementations, the XR presentation module 340 includes a data obtaining unit 342, a data association unit 344, an XR presenting unit 346, and a data transmitting unit 348.

In some implementations, the data obtaining unit 342 is configured to obtain data (e.g., presentation data, interaction data, sensor data, location data, etc.) from at least the controller 110 of FIG. 1. In various implementations, the data obtaining unit 342 is configured to obtain spatial features of an environment and XR content. To that end, in various implementations, the data obtaining unit 342 includes instructions and/or logic therefor, and heuristics and metadata therefor.

In some implementations, the localization unit 344 is configured to determine a location of the electronic device 120 in an XR environment and, in some implementations, a location to display virtual content in the XR environment. To that end, in various implementations, the data association unit 344 includes instructions and/or logic therefor, and heuristics and metadata therefor.

In some implementations, the XR presenting unit 346 is configured to present XR content via the one or more XR displays 312, e.g., at the location determined by the localization unit 344. To that end, in various implementations, the XR presenting unit 346 includes instructions and/or logic therefor, and heuristics and metadata therefor.

In some implementations, the data transmitting unit 348 is configured to transmit data (e.g., presentation data, location data, etc.) to at least the controller 110. To that end, in various implementations, the data transmitting unit 348 includes instructions and/or logic therefor, and heuristics and metadata therefor.

Although the data obtaining unit 342, the localization unit 344, the XR presenting unit 346, and the data transmitting unit 348 are shown as residing on a single device (e.g., the electronic device 120), it should be understood that in other implementations, any combination of the data obtaining unit 342, the localization unit 344, the XR presenting unit 346, and the data transmitting unit 348 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4A:
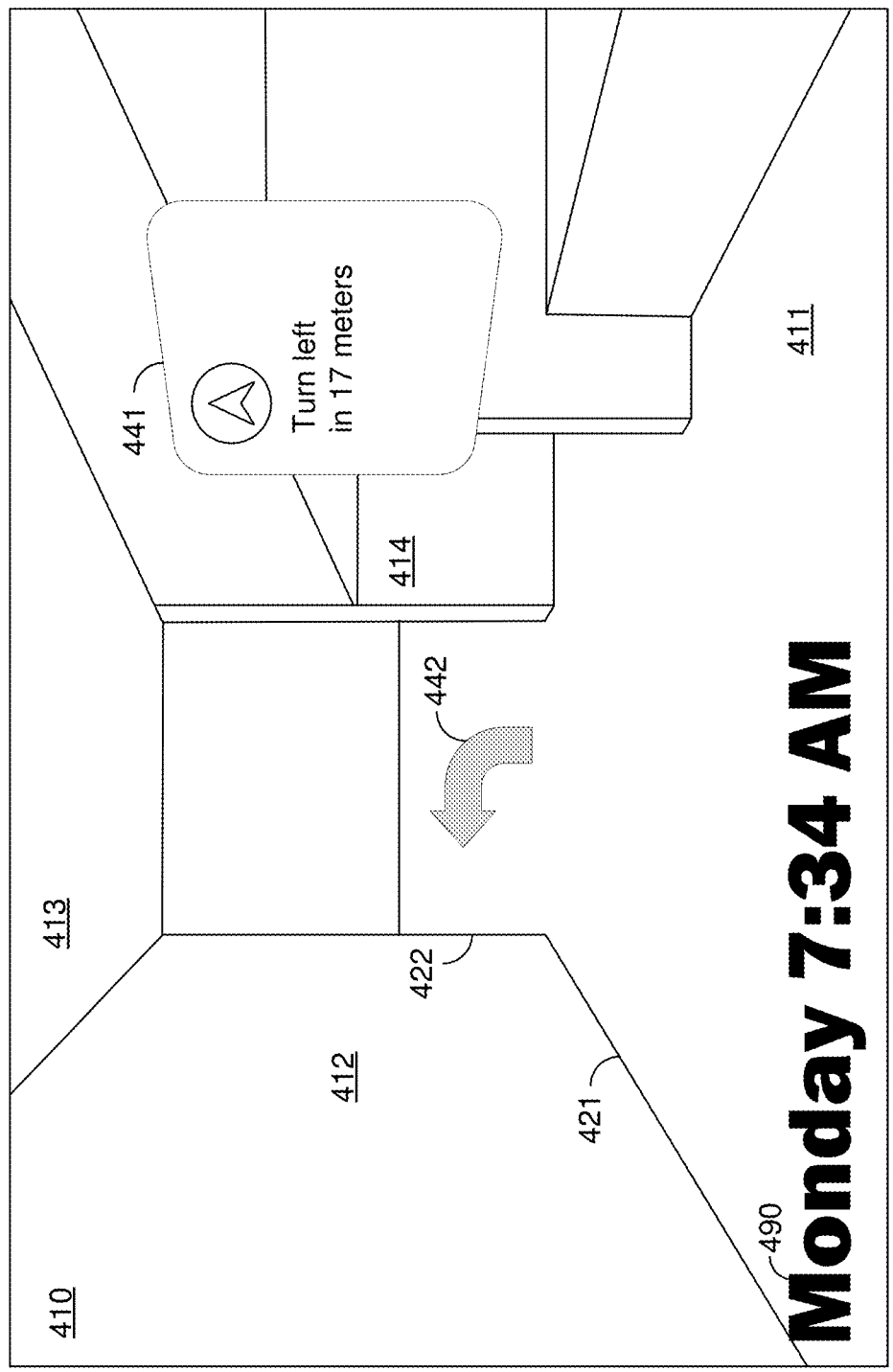
FIGS. 4A and 4B illustrate a XR environment in accordance with some implementations.

FIG. 4A illustrates an XR environment 410 presented, at least in part, by a display of an electronic device, such as the electronic device 120 of FIG. 3. The XR environment 410 is based on a first physical environment in which the electronic device is present.

The XR environment 410 includes a plurality of objects, including one or more physical objects (e.g., a floor 411, a first wall 412, a ceiling 413, and a second wall 414) of the physical environment and one or more virtual objects (e.g., a virtual navigation application window 441, a virtual turn indicator 442, and a virtual clock 490). In various implementations, certain objects (such as the physical objects and the virtual turn indicator 442) are presented at a location in the XR environment 410, e.g., at a location defined by three coordinates in a common three-dimensional (3D) XR coordinate system such that while some objects may exist in the physical world and the others may not, a spatial relationship (e.g., distance or orientation) may be defined between them. Accordingly, when the electronic device moves in the XR environment 410 (e.g., changes either position and/or orientation), the objects are moved on the display of the electronic device, but retain their location in the XR environment 410. Such virtual objects that, in response to motion of the electronic device, move on the display, but retain their position in the XR environment 410 are referred to as world-locked objects. In various implementations, the location in the XR environment 410 of certain virtual objects (such as the virtual navigation application window 441) changes based on the pose of the body of the user. Such virtual objects are referred to as body-locked objects. For example, as the user navigates through the XR environment 410, the virtual navigation application window 441 maintains a location approximately one meter in front and half a meter to the right of the user (e.g., relative to the position and orientation of the user's torso). As the head of the user moves, without the body of the user moving, the virtual navigation application window 441 appears at a fixed location in the XR environment 410.

In various implementations, certain virtual objects (such as the virtual clock 490) are displayed at locations on the display such that when the electronic device moves in the XR environment 410, the objects are stationary on the display on the electronic device. Such virtual objects that, in response to motion of the electronic device, retain their location on the display are referred to display-locked objects.

In the XR environment 410, the first wall 412 intersects the floor 411 at an intersection 421 and terminates at an edge 422. The virtual turn indicator 442 is displayed at a location in the XR environment 410 on the floor 411 between the first wall 412 and the second wall 414 just past the edge 422. The virtual navigation application window 441 provides instructions for the user to turn left in 17 meters.

As noted above, the virtual turn indicator 442 is a world-locked virtual object. Accordingly, in various implementations, the virtual turn indicator 442 is associated with a location in the XR environment 410 defined by a set of three-dimensional XR coordinates in the three-dimensional coordinate system of the XR environment 410. In various implementations, the pose of the device in the XR environment 410 includes a location of the device defined by a set of three-dimensional XR coordinates and an orientation of the device defined by a set of three degrees-of-freedom angles. In various implementations, an estimate of the pose of the device is determined using visual inertial odometry (VIO), e.g., using a camera and an inertial measurement unit (IMU).

Based on the estimate of the pose of the device and the location of the virtual turn indicator 442 in the XR environment 410, the electronic device determines a location on the display at which to display the virtual turn indicator 442.

Figure 4B:
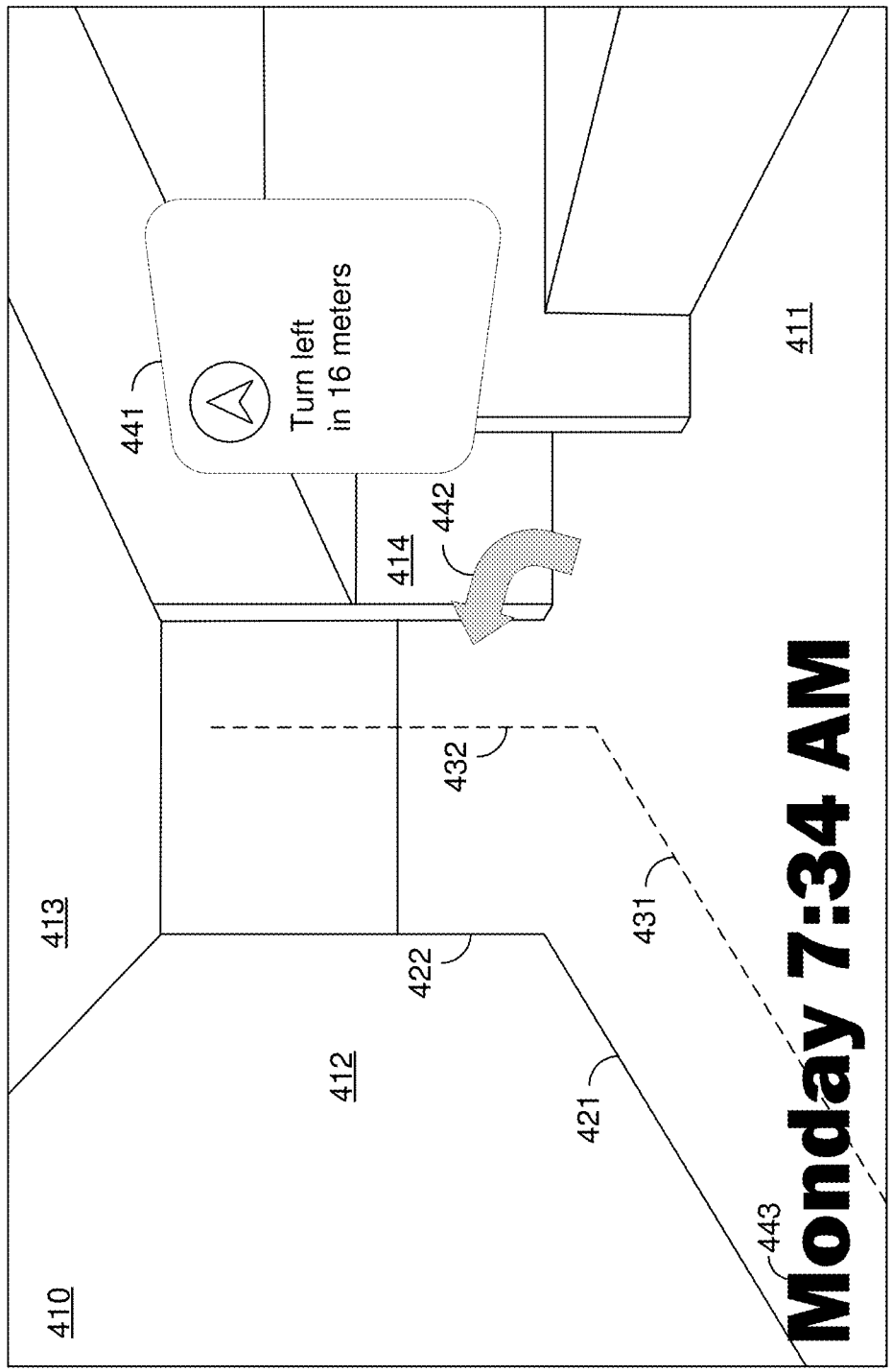

FIG. 4B illustrates the XR environment 410 with an inaccurate estimate of the pose of the device. In particular, the estimate of the location of the device differs from the true location of the device in that the estimate of the location is approximately one meter closer to the second wall 414 than the true location of the device. As a result, the virtual navigation application window 441 provides instructions for the user to turn left in 16 (rather than 17) meters. Further, the estimate of the orientation of the device differs from the true orientation of the device in that a yaw angle of the estimate of the orientation of the device is approximately 10 degrees to the left of the true orientation of the device. As a result, the virtual turn indicator 442 is displayed to the right, partially overlapping the second wall 414 rather than between the first wall 412 and the second wall 414. This inaccurate placement of the turn indicator 442 using VIO can be caused by changes to the XR environment 410 (e.g., placement of physical objects, lighting conditions, etc.) between the time the map or three-dimensional coordinate system of the XR environment 410 was created and the time represented by FIG. 4B.

In various implementations, the electronic device obtains an environmental model of the physical environment including one or more spatial features of the physical environment. Each of the spatial features is defined by a spatial feature location in the three-dimensional XR coordinate system.

In various implementations, the spatial feature location includes one or more points. For example, in various implementations, the environment model of the physical environment includes the spatial feature of the point at which the intersection 421 meets the edge 422. In various implementations, the spatial feature location is defined by one or more sets of three-dimensional XR coordinates.

In various implementations, the spatial feature location is a line, ray, or line segment. For example, in various implementations, the environmental model of the physical environment includes a spatial feature corresponding to the intersection 421. In various implementations, the spatial feature location is defined by a linear equation. In various implementations, the spatial feature location is defined by a first set of three-dimensional XR coordinates and a second set of three-dimensional XR coordinates. In various implementations, the spatial feature location is defined by first set of three-dimensional XR coordinates and an orientation and, in some implementations, a length.

In various implementations, the spatial feature location is a plane or planar segment. For example, in various implementations, the environmental model of the physical environment includes a spatial feature corresponding to the first wall 412. In various implementations, the spatial feature location is defined by a planar equation. In various implementations, the spatial feature location is defined by one or more sets of three-dimensional coordinates within the plane or planar segment.

Based on the (inaccurate) estimate of the pose of the device and the spatial feature locations of the spatial features corresponding to the intersection 421 and the edge 422, the electronic device would expect the spatial feature corresponding to the intersection 421 to be at the location 431 and the spatial feature corresponding to the edge 422 to be at the location 432. In response to detecting the intersection 421 and edge 422 at the locations shown in FIG. 4B, the electronic device updates its estimate of the pose of the device to display the virtual turn indicator 442 at the correct location on the display.

Thus, for each of the spatial features corresponding to the intersection 421 and the edge 422, the electronic device obtains a first spatial feature location from the environmental model. The electronic device further detects the spatial features corresponding to the intersection 421 and the edge 422 and estimates a second spatial feature location based on the estimate of the pose of the device. The electronic device determines a difference between the first spatial feature locations and the second spatial feature locations and updates the estimate of the pose of the device by removing this difference. Further, the electronic device determines a location on the display at which to display the virtual turn indicator 442 based on the updated estimate of the pose of the device and displays the virtual turn indicator 442 at that location on the display.

FIG. 5 is a flowchart representation of a method 500 of localizing a device in accordance with some implementations. In various implementations, the method 500 is performed by a device including one or more processors and non-transitory memory (e.g., the electronic device 120 of FIG. 3). In some implementations, the method 500 is performed by processing logic, including hardware, firmware, software, or a combination thereof. In some implementations, the method 500 is performed by a processor executing instructions (e.g., code) stored in a non-transitory computer-readable medium (e.g., a memory).

The method 500 begins, in block 510, with the device obtaining an estimate of a pose of the device in an environment. In various implementations, obtaining the estimate of the pose of the device includes receiving data from a visual inertial odometry (VIO) system including, e.g., a camera and an inertial measurement unit (IMU). In various implementations, the pose of the device includes a location of the device and an orientation of the device. In various implementations, the location of the device includes a set of three-dimensional coordinates in a three-dimensional coordinate system of the environment. In various implementations, the orientation of the device includes a set of three degree-of-freedom angles in the three-dimensional coordinate system of the environment.

The method 500 continues, in block 520, with the device obtaining an environmental model of the environment including a spatial feature in the environment defined by a first spatial feature location. In various implementations, the first spatial feature location is a line, ray, or line segment. For example, in FIG. 4B, in various implementations, the environmental model of the physical environment includes a spatial feature corresponding to the edge 422 defined by a line segment. In various implementations, the first spatial feature location is a plane or planar segment. For example, in FIG. 4B, in various implementations, the environmental of the physical environment includes a spatial feature corresponding to the wall 412 defined by a planar segment.

In various implementations, the first spatial feature location includes at least one set of coordinates in a three-dimensional coordinate system of the environment. For example, in FIG. 4B, in various implementations, the spatial feature corresponding to the edge 422 is defined by a first set of three-dimensional coordinates corresponding to where the edge 422 meets the ceiling 413 and a second set of three-dimensional coordinates corresponding to where the edge 422 meets the floor 411.

The method 500 continues, in block 530, with the device determining a second spatial feature location of the spatial feature based on the estimate of the pose of the device. In various implementations, determining the second spatial feature location of the spatial feature includes capturing, using an image sensor, an image of the environment and detecting the spatial feature in the image of the environment. In various implementations, the device determines a plurality of two-dimensional coordinates of points in the image corresponding to a first plurality of three-dimensional coordinates of points of the spatial feature obtained from the environmental model. Further, based on the estimate of the pose of the device (and, in various implementations, intrinsic parameters of the image sensor) and the plurality of two-dimensional coordinates of points in the image, the device determines a second plurality of three-dimensional coordinates of points of the spatial feature location. For example, in various implementations, the device determines the second plurality of three-dimensional coordinates using the pinhole camera model equation.

In various implementations, implementations, determining the second spatial feature location of the spatial feature includes receiving, from a depth sensor, depth data of the environment and detecting the spatial feature in the depth data of the environment. In various implementations, the device determines a plurality of depths from the device to points in the depth data corresponding to a first plurality of three-dimensional coordinates of points of the spatial feature obtained from the environmental model. Further, based on the estimate of the pose of the device and the plurality of depths, the device determines a second plurality of three-dimensional coordinates of points of the spatial feature location.

The method 500 continues, in block 540, with the device determining an updated estimate of the pose of the device based on the first spatial feature location and the second spatial feature location. In various implementations, determining the updated estimate of the pose of the device includes determining a difference between the first spatial feature location and the second spatial feature location and removing the difference from the estimate of the pose of the device. If various implementations, determining the difference between the first spatial feature location and the second spatial feature location includes determining an average difference between a plurality of points of the first spatial feature location and a corresponding plurality of points of the second spatial feature location. In various implementations, removing the difference from the estimate of the pose of the device includes updating an estimate of the location of the device. For example, in various implementations, removing the difference from the estimate of the pose of the device includes subtracting the difference from the pose of the device. While this may be suitable for smaller inaccuracies, such subtraction only effects a translation of the estimate of the location of device without effecting the estimate of the orientation. Accordingly, in various implementations, removing the difference from the estimate of the pose of the device includes updating an estimate of the orientation of the device. For example, in various implementations, removing the difference from the estimate of the pose of the device includes selecting an estimate of the pose of the device that minimizes a cost function of the difference between the first spatial feature location and the second spatial feature location (which is based on the estimate of the pose of the device). For smaller inaccuracies, such optimization may be computationally efficient.

In various implementations, the method 500 further includes obtaining content to be presented at a content location in the environment. For example, in FIG. 4A, the electronic device obtains data regarding the virtual turn indicator 442. The method 500 includes determining a location on a display to display the content based on the updated estimate of the pose of the device and displaying the content at the location on the display. For example, in FIG. 4A, the electronic device displays in the virtual turn indicator 442 between the first wall 412 and second wall 414.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a device including an image sensor, one or more processors, and non-transitory memory:
    obtaining an estimate of a pose of the device in an environment;
    obtaining an environmental model of the environment including a spatial feature in the environment defined by a first spatial feature location;
    determining a second spatial feature location of the spatial feature based on the estimate of the pose of the device; and
    determining an updated estimate of the pose of the device based on the first spatial feature location and the second spatial feature location at least in part by determining a difference between the first spatial feature location and the second spatial feature location and removing the difference from the estimate of the pose of the device.

2. The method of claim 1, further comprising:
    obtaining content to be presented at a content location in the environment;
    determining a location on a display to display the content based on the updated estimate of the pose of the device; and
    displaying the content at the location on the display.

3. The method of claim 1, wherein obtaining the estimate of the pose of the device includes receiving data from visual inertial odometry system.

4. The method of claim 1, wherein the first spatial feature location is a line, ray, or line segment.

5. The method of claim 1, wherein the first spatial feature location is a plane or planar segment.

6. The method of claim 1, wherein the first spatial feature location includes at least one set of three-dimensional coordinates in a three-dimensional coordinate system of the environment.

7. The method of claim 1, wherein determining the second spatial feature location of the spatial feature includes capturing, using the image sensor, an image of the environment and detecting the spatial feature in the image of the environment.

8. The method of claim 1, wherein determining the second spatial feature location of the spatial feature includes receiving, from a depth sensor, depth data of the environment and detecting the spatial feature in the depth data of the environment.

9. A device comprising:
    a non-transitory memory; and
    one or more processors to:
    obtain an estimate of a pose of the device in an environment;
    obtain an environmental model of the environment including a spatial feature in the environment defined by a first spatial feature location;
    determine a second spatial feature location of the spatial feature based on the estimate of the pose of the device; and
    determine an updated estimate of the pose of the device based on the first spatial feature location and the second spatial feature location at least in part by determining a difference between the first spatial feature location and the second spatial feature location and removing the difference from the estimate of the pose of the device.

10. The device of claim 9, wherein the one or more processors are further to:
    obtain content to be presented at a content location in the environment;
    determine a location on a display to display the content based on the updated estimate of the pose of the device; and
    display the content at the location on the display.

11. The device of claim 9, wherein the one or more processors are to obtain the estimate of the pose of the device by receiving data from visual inertial odometry system.

12. The device of claim 9, wherein the first spatial feature location is a line, ray, or line segment.

13. The device of claim 9, wherein the first spatial feature location is a plane or planar segment.

14. The device of claim 9, wherein the first spatial feature location includes at least one set of three-dimensional coordinates in a three-dimensional coordinate system of the environment.

15. The device of claim 9, wherein the one or more processors are to determine the second spatial feature location of the spatial feature by capturing, using an image sensor, an image of the environment and detecting the spatial feature in the image of the environment.

16. The device of claim 9, wherein the one or more processors are to determine the second spatial feature location of the spatial feature by receiving, from a depth sensor, depth data of the environment and detecting the spatial feature in the depth data of the environment.

17. A non-transitory memory storing one or more programs, which, when executed by one or more processors of a device cause the device to:
    obtain an estimate of a pose of the device in an environment;
    obtain an environmental model of the environment including a spatial feature in the environment defined by a first spatial feature location;
    determine a second spatial feature location of the spatial feature based on the estimate of the pose of the device; and determine an updated estimate of the pose of the device based on the first spatial feature location and the second spatial feature location at least in part by determining a difference between the first spatial feature location and the second spatial feature location and removing the difference from the estimate of the pose of the device.

18. The non-transitory memory of claim 17, wherein the one or more programs, when executed, further cause the device to:

obtain content to be presented at a content location in the environment;

determine a location on a display to display the content based on the updated estimate of the pose of the device; and display the content at the location on the display.

* * * * *